United States Patent [19]
Heckner

[11] Patent Number: 5,931,426
[45] Date of Patent: Aug. 3, 1999

[54] FIXING SYSTEM

[75] Inventor: Helmut Heckner, Vilshofen, Germany

[73] Assignee: Knuerr-Mechanik Für die Elektronik Aktiengesellschaft, München, Germany

[21] Appl. No.: 08/851,890

[22] Filed: May 6, 1997

[30] Foreign Application Priority Data

May 6, 1996 [DE] Germany .......................... 196 18 127

[51] Int. Cl.⁶ .................................................. A47B 96/06
[52] U.S. Cl. ................... 248/220.21; 248/250; 248/235; 211/187; 403/353; 403/316
[58] Field of Search ............... 248/220.21, 174, 248/235, 240, 250; 211/187, 192, 208, 182; 403/353, 393, 315, 316

[56] References Cited

U.S. PATENT DOCUMENTS

| | | | |
|---|---|---|---|
| 3,248,079 | 4/1966 | Kennedy | 211/187 X |
| 3,272,345 | 9/1966 | Wallace | 211/187 X |
| 3,353,684 | 11/1967 | Chesley | 211/187 |
| 3,631,821 | 1/1972 | Zachariou | 211/187 X |
| 4,204,480 | 5/1980 | Hanna | 211/187 |
| 4,378,925 | 4/1983 | Griffin | 211/187 X |
| 4,515,494 | 5/1985 | Robilliard et al. | 211/187 X |
| 4,553,725 | 11/1985 | Vargo | 211/187 X |
| 5,265,740 | 11/1993 | Hodsden et al. | 211/187 |
| 5,277,393 | 1/1994 | Nicholson et al. | 248/235 X |
| 5,538,213 | 7/1996 | Brown | 248/250 X |
| 5,575,444 | 11/1996 | Otema | 248/250 X |
| 5,611,442 | 3/1997 | Howard | 211/187 |

*Primary Examiner*—Leslie A. Braun
*Assistant Examiner*—Long Dinh Phan
*Attorney, Agent, or Firm*—Evenson, McKeown, Edwards & Lenahan, PLLC

[57] ABSTRACT

The invention relates to a fixing system for the rapid fixing of a component connected to a structural part, such as a sectional rail or flat band, to a further component, such as a vertical strut. A particularly simple fixing structure and an extremely rapid clamping retention is obtained according to the invention by clamping elements and spacing elements, which are constructed on the component connected to the structural part to be fixed and which cooperate with elongated and round holes of a row of holes or with a slot in the further component. The component to be wedged is preferably made from sheet steel.

19 Claims, 2 Drawing Sheets

FIXING SYSTEM

BACKGROUND OF THE INVENTION

1. Field of the Invention

This invention relates to a fixing system, having a first component with at least one elongated hole opening, and a second component, which can be fixed to the first component by at least one fixing element.

2. Description of Related Art

For the construction of racks, cases and cabinets, e.g. 19" instrument cabinets, vertically and horizontally positioned components, usually cut-to-length sectional struts, are joined to form a frame structure and provided with cladding or facing parts.

For the reception of printer and keyboard slide-in modules and similar equipment or electrical or electronic subassemblies, use is made of rail-like components, e.g. telescopic rails. Hitherto fixing has generally taken place with fixing screws, which cooperate with correspondingly constructed nuts in the bores or T-slots of the sectional struts. The assembly of the rail-like components, flat plates and similar components involves a time expenditure, which has a disadvantageous effect in the construction and reconstruction of an instrument cabinet, rack, etc.

SUMMARY OF THE INVENTION

The object of the invention is to provide a fixing system which, because of an extremely simple construction, allows a rapid fixing of a structural part or component to another component.

According to the present invention, the object is achieved by a fixing system comprising a first component having at least one elongated hole opening, a second component, and at least one fixing element for fixing the second component to the first component. The first component has as an elongated hole opening, a row of holes of alternating elongated holes and round holes. The second component has, at a margin as fixing elements, clamping elements for a clamping retention and spacing elements for an engagement or reception in the enlongated holes and round holes of the first component, respectively.

The object of the present invention is further achieved by a fixing system including a first component having at least one elongated hole opening, a second component, and at least one fixing element for fixing the second component to the first component. The first component has as an elongated hole opening, a groove, in particular a T-groove. The second component has, at a margin, fixing elements as fixing elements clamping elements for a clamping retention and spacing elements for an engagement or a reception in the groove of the first component, respectively.

Advantageous, appropriate developments are contained in the subclaims and description relative to the drawings.

The invention is based on the basic concept of interconnecting two components by a clamping retention and to achieve the latter by clamping elements, which are arranged in integrated manner in at least one component and are preferably shaped at its margin. The clamping elements and spacing elements cooperate with a groove or a row of holes having alternating openings, preferably elongated holes and round holes, and are constructed in such a way that there is a back-grip, particularly on the rims of the elongated holes or the groove, and an engagement, preferably in or on the round holes or the groove. The back-gripping clamping elements and the spacing elements engaging on or in the openings allow a wedging of the component to be fixed. Particularly in the case of facing wedging of the component to be fixed, this requires no additional fixing elements for a secure and stable retention.

A further advantage is that an extremely rapid fixing is possible, because only the marginally shaped clamping and spacing elements have to be introduced or engaged in the row of holes or in the groove, particularly in a T-slot, and wedged by a subsequent pivoting by approximately 90°. A one-sided, clamped structural part has, in the fixing position, a pivoting range of approximately 10°. As soon as a component with its two marginal areas is wedged in rows of holes or T-slots of adjacent sections, such a clearance no longer exists and instead there is a reliable, stable wedging and fixing between the two sections.

It is particularly advantageous to join at least one component of the fixing system according to the invention to another component or structural part, e.g. a telescopic rail and thereby bring about a particularly efficient fixing of the telescopic rail to a component and particularly to a sectional strut, which has at least a row of holes and/or at least a groove or a slot. It is preferable to join and, in particular, screw the component of the fixing system having the clamping and spacing elements to the structural part to be fixed, e.g. the telescopic rail. If the second component is constituted by a sectional strut, the telescopic rail or also a side wall or any other subassemblies can be particularly rapidly fixed to the sectional strut without any further aids.

In the fixing position, the component to be fixed is virtually engaged on the surface having the row of holes or the slot and is consequently virtually at right angles to the profile surface.

In a preferred construction the clamping elements are bent and given a hook-like construction for a back-grip on recesses, holes, bores, etc., particularly on the elongated holes or the groove. The spacing or positioning elements are slightly bent, e.g. with an inclination angle of approximately 10° and terminally rounded for engagement in the round holes or in the slit of the groove.

In principle, it is also possible to have a back-grip in the round holes and a positive reception in the elongated holes. The cooperation of the back-gripping clamping hooks and the engaging spacing elements or spacing elements received in the round holes is important for a wedging of the component to be fixed.

It is particularly advantageous, for a clamp fit and a positive and non-positive connection of two components, that there is an alternating arrangement of the clamping hooks and spacing elements or of the elongated holes and round holes, the latter being in particular constructed as circular bores.

A preferred construction of the rapid fixing means according to the invention has two round holes, which are delimited by an upper and a lower elongated hole. Correspondingly on an associated component to be filled two spacing elements are delimited by an upper and lower clamping hook. The raster or grid dimension of the holes of the row of holes and the clamping and spacing elements are matched to one another.

BRIEF DESCRIPTION OF THE DRAWINGS

The invention is described in greater detail hereinafter relative to the diagrammatic drawings.

DESCRIPTION OF THE PREFERRED EMBODIMENTS

Figure 1:
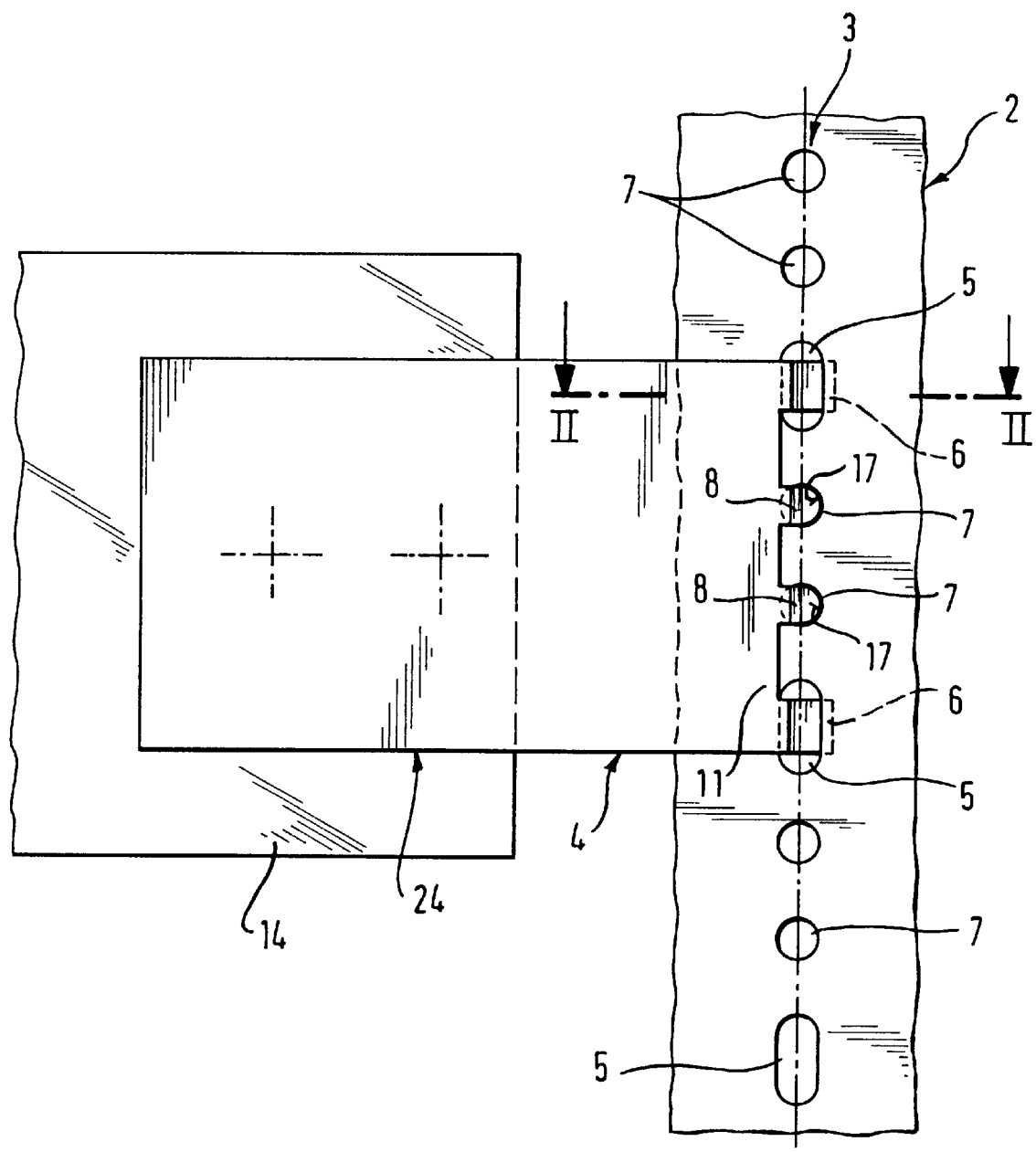
FIG. 1 is a view of a fixing system according to the invention used for fixing a structural element.

FIG. 1 shows in detail as an example for a fixing system according to the invention a first component 2, which is a vertical sectional strut of an instrument cabinet, and a second component 4, which serves as a fixing element for a structural element 14 to be fixed, e.g. for a telescopic rail and which is to be connected to the component 2. The vertical sectional strut 2, which is e.g. made from aluminium or steel, has a row of holes 3 of raster-like positioned elongated holes 5 and round holes 7, two round holes 7 being formed between an upper and a lower elongated hole 5. The round holes 7 are circular bores.

To the sectional strut 2 is fixed as the second component 4 a rail-like fixing element, to which is fixed the structural element 14, only shown in detail form, e.g. by means of not shown fixing screws and which has at its margin an area 11 with integrated clamping elements 6 and spacing elements 8. The view according to FIG. 1 makes it clear that the clamping elements 6 and spacing elements 8 of the fixing element 4 are constructed in complementary manner to the two different hole types 5, 7 of the vertical sectional strut 2 and have the same raster dimensions as the holes 5, 7 of the vertical section 2.

Figure 2:
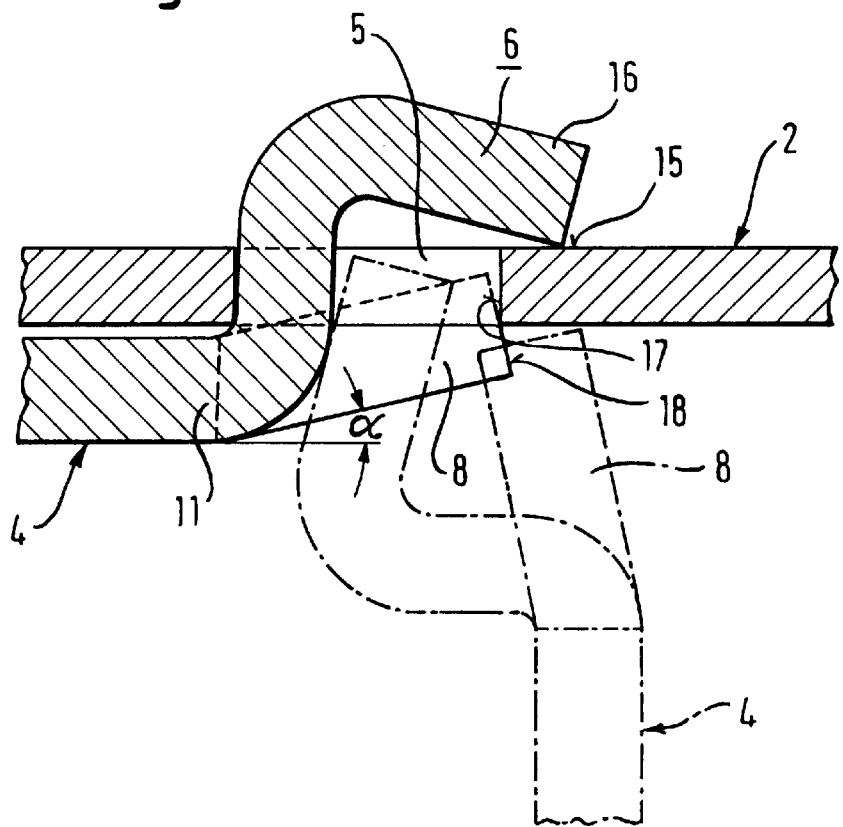
FIG. 2 is a section along line II—II of FIG. 1, but without a structural element.
Figure 3:
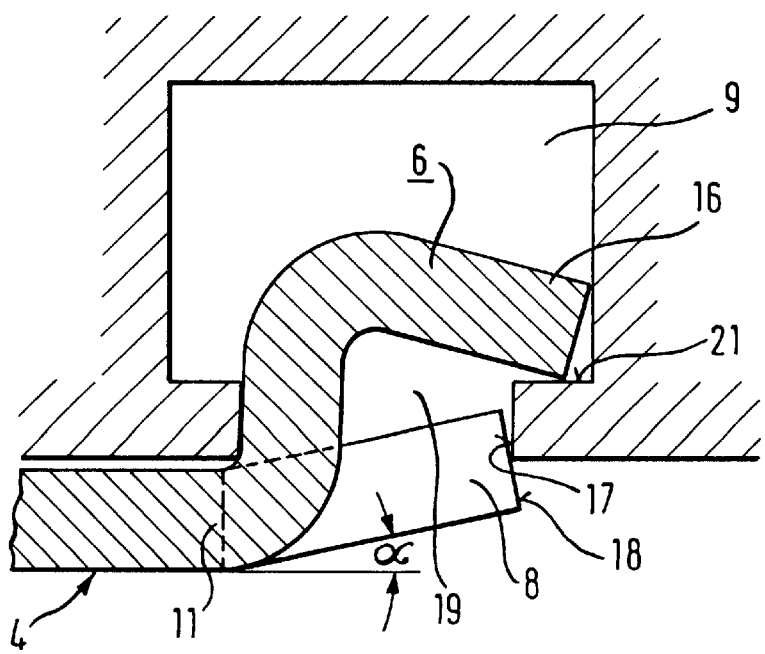
FIG. 3 is a section through a fixing system as in FIG. 2, but in a T-slot.

As clamping elements are formed clamping hooks 6, which are bent twice for back-gripping the elongated hole 5 and for engaging on a backside area 15 at a margin of the elongated hole 5, (cf. also FIGS. 2 and 3).

For positioning purposes in the vicinity of a round hole 7, particularly with simultaneous engagement on an inner marginal area 17 of the round hole 7, tongue-like spacing elements 8 are formed, which together with the clamping hooks 6, due to their arrangement and bending or bevelling, bring about a clamping retention of the marginal area 11.

It falls within the scope of the invention to construct varying rows of holes and provide corresponding clamping and spacing elements. It also falls within the scope of the invention if there is only one round hole or more than two round holes between two elongated holes or to provide further alternating arrangements of different holes, which cooperate with complementary constructed clamping and positioning elements 6, 8.

Preferably the component 4 of the fixing system according to the invention serving as a fixing element for further components and structural elements 14 is made from sheet steel with a wall thickness of 2.0 mm. The wall thickness of the first component, e.g. a vertical strut, when using an aluminium section can be 1.9 mm and when using a steel section 1.5 mm.

FIG. 2 shows the clamping retention and rapid fixing. The dot-dash lines indicate a fixing element in the form of a second component 4 in a position where the clamping elements 6 have not or have only partly been introduced into the elongated holes 5 of the sectional strut as the first component 2 and the spacing elements 8 have not yet been finally positioned and are instead supported on the outer rim of the round holes 7. Continuous and broken lines indicate the clamping position of the second component 4 to be fixed and the arrangement of a clamping element 6 and a spacing element 8 in the clamping position.

The second component 4 has clamping hooks 6 and spacing elements 8 arranged in integrated manner on an area 11 at its margin. At the area 11 at the margin the clamping hooks 6 are bent at right angles and provided with a clamping leg 16, which is inclined inwards and ensures the back-grip and engagement on a backside area 15 at the margin of an elongated hole 5. The vertical dimensions of the clamping hook 6 match those of the elongated hole 5. A spacing element 8 below the clamping hook 6 is in slight engagement within the round hole 7 and is supported by an and face 18 on an inner marginal area 17 of the round hole 7. The spacing element 8 is slightly bevelled in the marginal area 11. An inclination angle α can be approximately 10°.

In the same way as in FIG. 2, FIG. 3 shows a clamping retention of a fixing element as component 4 with a marginal area 11. The same features are given the same reference numerals. The second component 4, which is provided for fixing a structural element 14, only shown in FIG. 1, unlike in FIGS. 1 and 2 is not fixed in a row of holes, but instead in a T-slot 9 as a groove of a first component 2.

For a variable fixing of components 2, 4 it is advantageous to provide both a row of holes 3 and a groove or slot 9 in the first component 2.

A clamping leg 16 of the clamping hook 6 engages on an inside 21 of a slot leg and for this purpose is guided through a slit 19 of the T-slot 9. The spacing element 8 engages on an inner marginal area 17 of the slit 19 of T-slot 9.

As shown in the drawings, the spacing elements 8 are much shorter than the clamping hooks 6 and by a clearly defined engagement or support ensure a precise arrangement and positioning of the clamping elements 6 in a row of holes 3 or a T-slot 9.

On the clamping leg 16 and in particular on the terminal area thereof, the clamping hook 6 can be provided with small, pointed extensions, which engage in the surface layer.

The fixing system according to the invention with a first and a second component is suitable for rapid, assembly-friendly fixing of various assemblies and structural parts and in particular for fixing rail-like components, such as telescopic rails, in a cabinet or rack system.

I claim:

1. Fixing system comprising:

a first component having a row of holes therein, and a second component having fixing elements for fixing said second component to said first component, the fixing elements being clamping elements and spacing elements which are provided at a margin of said second component, wherein said first component has, as said row of holes, alternating elongated holes and round roles, and wherein the clamping and spacing elements are inserted into said elongated and round holes respectively, whereby an end face of each of said spacing elements is adapted to be engaged with an inner marginal area of a corresponding round hole and wedged after subsequent pivoting of the second component.

2. Fixing system according to claim 1, wherein said clamping elements are constructed for a back-grip of said elongated holes and said spacing elements are constructed for engagement in said round holes.

3. Fixing system according to claim 1, wherein said first component is a sectional strut and said row of holes is a raster-like arrangement of at least one round hole and lower and upper elongated holes.

4. Fixing system according to claim 1, wherein said second component is fixed to a structural part and has at least one area at said margin with said clamping elements and said spacing elements, said clamping elements and said spacing elements being constructed in a manner complementary to said row of holes of said first component.

5. Fixing system according to claim 4, wherein, for fixing said structural part, said second component is fixed to two facing fixing areas of said structural part by screw connections.

6. Fixing system according to claim 1, wherein said second component is integrated in a structural part and has at least one area at said margin with said clamping elements and said spacing elements, said clamping elements and said spacing elements being constructed in a manner complementary to said row of holes of said first component.

7. Fixing system according to claim 1, wherein said second component is integrated in a flat plate as a structural part, said clamping elements and spacing elements of said second component being outwardly directed elements on a fixing area at a margin of said structural part.

8. Fixing system according to claim 1, wherein said second component is fixed on a flat plate as a structural part, said clamping elements and spacing elements of said second component being outwardly directed elements on a fixing area at a margin of said structural part.

9. Fixing system according to claim 1, wherein said second component is integrated in a sectional rail as a structural part, said clamping elements and spacing elements of said second component being outwardly directed elements on a fixing area at a margin of said structural part.

10. Fixing system according to claim 1, wherein said second component is fixed on a sectional rail as a structural part, said clamping elements and spacing elements of said second component being outwardly directed elements on a fixing area at a margin of said structural part.

11. Fixing system according to claim 1, wherein said clamping elements are clamping hooks, each of which is constructed for back-gripping of an elongated hole, and each of said spacing elements is constructed in tongue-like manner for positive engagement in a round hole.

12. Fixing system according to claim 11, wherein each clamping hook is double bent and engages with a terminal bevelled clamping leg on a back side area of a margin of said elongated hole.

13. Fixing system according to claim 11, wherein each spacing element is bent towards one of said clamping hooks and, in a clamping position, engages on an area at a margin of said round hole.

14. Fixing system according to claim 11, wherein said clamping hooks, in areas of their clamping legs, are provided with pointed extensions which engage in said first component.

15. Fixing system according to claim 1, wherein said second component can be inserted in a virtually right-angled arrangement into said row of holes of said first component and, following an approximately 90° rotation, can be brought into a clamping position by a back-grip and engagement.

16. Fixing system comprising:

a first component having at least one groove, a second component, and at least one fixing element for fixing said second component to said first component, wherein said first component has a T-groove and said second component has a margin including clamping elements for clamping retention and spacing elements for engagement in said T-groove of said first component, respectively, and wherein the clamping elements and spacing elements are inserted in said T-groove, whereby an end face of each of said spacing elements is adapted to be engaged with an inner marginal area of a slit of said T-groove and wedged after subsequent pivoting of the second component.

17. Fixing system according to claim 16, wherein said clamping elements are constructed for a back-grip of said T-groove and said spacing elements are constructed for partial reception in said T-groove.

18. Fixing system according to claim 16, wherein said second component can be inserted in a virtually right-angled arrangement into said T-groove of said first component and, following an approximately 90° rotation, can be brought into a clamping position by a back-grip and engagement.

19. Fixing system according to claim 18, wherein two second components, in each case with outwardly directed clamping elements and spacing elements arranged on facing fixing areas of a structural part, are provided.

* * * * *